(No Model.)

R. W. BURKHARDT.
HOSE COUPLING.

No. 571,212. Patented Nov. 10, 1896.

Witnesses:

Inventor:
Robert W. Burkhardt
Louis Ruggu & Co.
Attorneys.

UNITED STATES PATENT OFFICE.

ROBERT WILLIAM BURKHARDT, OF LARAMIE CITY, WYOMING, ASSIGNOR OF THREE-FOURTHS TO GEORGE B. HURD, OF NEW YORK, N. Y., AND GEORGE S. PORTER, OF GLEN RIDGE, NEW JERSEY.

HOSE-COUPLING.

SPECIFICATION forming part of Letters Patent No. 571,212, dated November 10, 1896.

Application filed January 6, 1896. Serial No. 574,489. (No model.)

*To all whom it may concern:*

Be it known that I, ROBERT WILLIAM BURKHARDT, a citizen of the United States, and a resident of Laramie City, in the county of Albany and State of Wyoming, have invented certain new and useful Improvements in Hose-Couplings; and I do hereby declare that the following is a full, clear, and exact description of the invention, which will enable others skilled in the art to which it appertains to make and use the same, reference being had to the accompanying drawings, which form a part of this specification.

My invention relates to improvements in couplings for fire-hose which can be very quickly connected together to form a water-tight joint without any danger of the parts becoming accidentally detached, but which can be readily disconnected when desired.

The object of the invention is to provide a hose-coupling of the above character which shall possess superior advantages with respect to simplicity in construction, efficiency in operation, and rapidity and ease by which the section can be connected and disconnected.

The invention consists in the novel construction and combination of parts hereinafter fully described and claimed.

Figure 1:
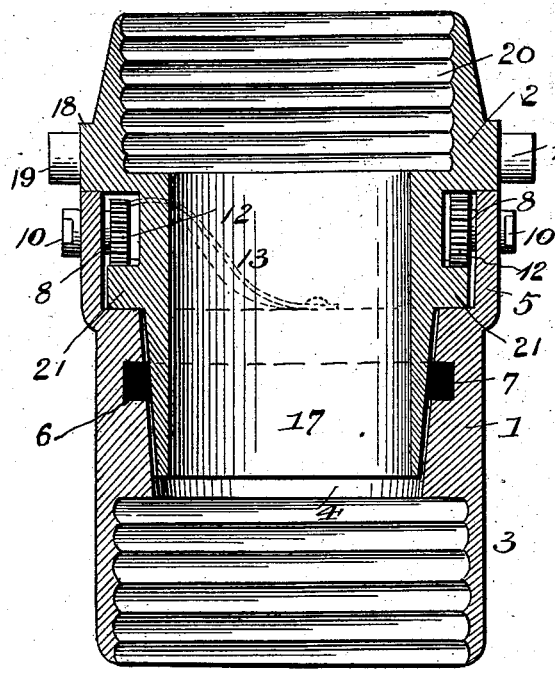
Figure 2:
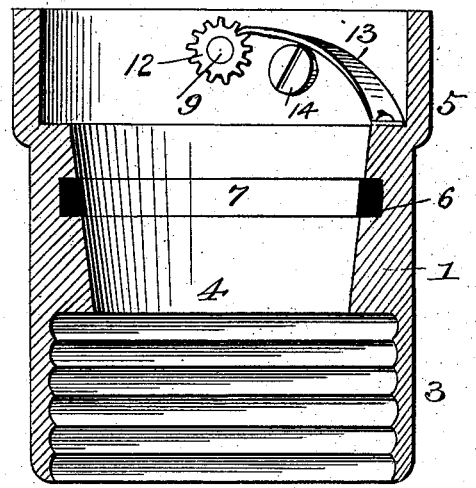
Figure 3:
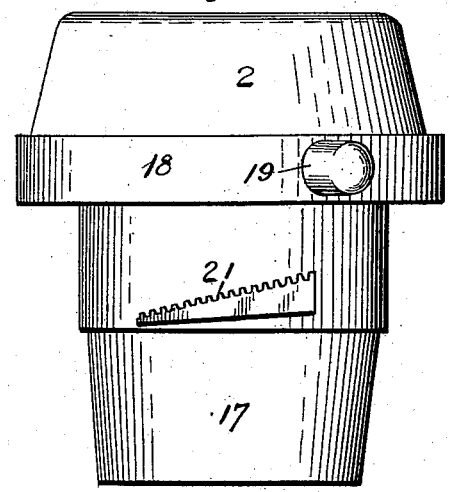
Figure 4:
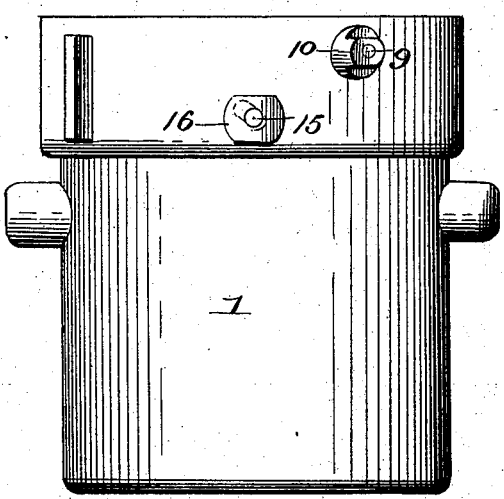
Figure 5:
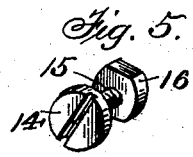

In the accompanying drawings, Figure 1 is a longitudinal sectional view showing two sections of a hose-coupling constructed according to my invention and connected together or with each other. Fig. 2 is a similar view of one of the sections detached or disconnected. Fig. 3 is an elevation of the other or male section. Fig. 4 is an elevation of the female section. Fig. 5 is a detail view of the bolt for actuating the spring.

In the said drawings the reference-numerals 1 and 2 designate two sections of a hose-coupling, to one end of each of which the hose is secured in any ordinary or suitable manner.

The numeral 1 designates the female section, consisting of a cylindrical portion 3, a tapering socket 4, and a cylindrical head 5, and is formed with an annular groove 6 to receive a rubber gasket 7. Formed on the inner and outer sides of said head are bosses 8, through which pass headed screw-studs 9, which are held in place by nuts 10, and journaled on these studs are pinions 12. Two of such shafts and pinions are shown in the present instance, although more may be employed, if desired. Secured to the edge of the socket 4 is a flat spring 13, the free end of which is adapted to engage with said pinions. Engaging with one side of these springs is a head 14 of a screw pin or bolt 15, which passes through and works in an inclined slot in the head 5 and is held in place by a nut 16.

The numeral 2 designates the male section, which consists of the tapering portion 17, the flange 18, provided with lugs 19, and cylindrical portion 20, to which the hose is secured.

The numeral 21 designates segments or inclined rack-bars formed on the exterior of the tapering portion 17, corresponding in number with the pinions 12, with which they engage.

The operation is as follows: The tapering end of the male section is inserted in the socket of the female section and then given a turn which will cause the segment-bars 21 to pass behind and engage with the pinions, and by reason of the inclination of said bars drawing the two sections together, forming a water-tight joint between said tapering end and the socket and securely connecting said sections together. The flat spring will engage with the teeth of one of said pinions and will prevent rotation of the same, and by this means prevent any liability of the two sections from being accidentally disconnected or disengaged from each other. To disconnect the sections, the bolt or pin against which the spring rests is slid back in the inclined slot, which will throw the spring out of engagment with the pinion, allowing the latter to rotate, so that the male section can be turned and withdrawn.

By the peculiar construction of the two sections a water-tight chamber is formed between the same, in which the segment-bars and pinions are located.

The purpose of the lugs 19 is for a wrench to be engaged therewith for turning the male section to engage the rack-bars with the pinions.

Having thus fully described my invention, what I claim is—

1. In a hose-coupling the combination with the female section having a socket, an enlarged head, the pinions pivoted to the inner side of said heads, the spring engaging therewith and the headed pin provided with a nut working in an inclined slot in said head for throwing the spring into and out of engagement with one of the pinions, of the male section provided with segments or inclined rack-bars on the outside thereof with which said pinions engage; substantially as described.

2. In a hose-coupling the combination with the female section having a tapering socket formed with an annular groove, the gasket seated therein, the enlarged head formed with an inclined slot and a series of bosses, the studs passing through said bosses, the pinions journaled therein, the flat spring secured to the end of the socket and engaging with one of said pinions, and the headed pin passing through said slot and provided with a nut, of the male section having a tapering end fitting in said socket, a series of segments or inclined rack-bars and a peripheral flange provided with lugs, substantially as described.

In testimony that I claim the foregoing as my own I have hereunto affixed my signature in presence of two witnesses.

ROBERT WILLIAM BURKHARDT.

Witnesses:
JOHN T. REED,
WM. L. ALLEN.